United States Patent Office 2,957,775
Patented Oct. 25, 1960

2,957,775

GYPSUM COMPOSITION

Robert E. Jacobson, Chicago, Ill., assignor to United States Gypsum Company, Chicago, Ill., a corporation of Illinois No Drawing. Filed June 27, 1957, Ser. No. 668,323

12 Claims. (Cl. 106—116)

This invention relates to a new gypsum composition and more particularly relates to gypsum compositions having reduced water absorption rates and to materials incorporating such compositions.

Gypsum is utilized in the building field for a wide variety of materials. For example, gypsum board lath or plaster-base is a well known article of commerce and one class thereof is embodied in perforated lath which is particularly useful as a plaster base. The manufacture of such perforated gypsum lath is described in United States Patent No. 1,938,354 to Roos.

Broadly, conventional perforated gypsum lath comprises a board having a central set gypsum core of a cementitious character and a plurality of paper sheets covering the core. A plurality of regularly spaced apertures are provided extending through the board to the opposed surfaces thereof. In such a construction the gypsum core is exposed at each aperture. In use perforated gypsum lath is mounted on studding to form a base for a plaster wall, and the plaster applied to the surface thereof by troweling or otherwise. The plaster so applied to said perforated board penetrates the apertures to lock the surface coat to the lath. Accordingly it is apparent that the plaster coat contacts the gypsum core of said lath at the apertures in the board. Generally, the paper cover sheets utilized in the lath contain a sizing material while the core contains no such size. The ultimate result of the ordinary construction of this type is that a difference in absorption rates are present between the cover sheets and the gypsum core. This differential absorption is particularly manifest in the workability of the plaster when the plaster coat is leveled with the rod on the lath surface. The gypsum core, having a high rate of water absorption, soaks up the water present in the plasted adjacent to and contacting the core at the apertures in the perforated lath, and causes the plaster to stiffen over the apertures due to change in plasticity. This stiffening makes the plaster difficult to smooth and shortens the working life of the plaster before completion of the application. In some cases this difficulty persists even to the second application or coat of plaster. Similar difficulties may be encountered in other gypsum articles such as for example gypsum tile which is subsequently coated with plaster. Thus, it may be seen that the desirability of having the exposed core of the perforated lath absorb water at the same rate as the paper cover sheets has long been recognized.

Accordingly, it is one object of the present invention to provide a perforated gypsum board having a water absorption rate for the gypsum core substantially the same as that of the paper cover.

Another object is the provision of a gypsum composition having utility in manufacture of gypsum articles that has a reduced water absorption rate as compared to ordinary set gypsum.

Another object is the provision of a perforated gypsum lath which permits an extended working life for the plaster coat being applied thereto.

These and other objects of the present invention will become apparent from the following description and the appended claims.

Accordingly in one broad form, the present invention comprises a gypsum composition having a reduced water absorption rate which comprises predominantly set gypsum crystals in admixture with a Diels-Alder adduct of maleic anhydride and a natural resin acid, and an acidic precipitating agent.

The set gypsum crystals are, of course, provided by the addition of water to calcium sulfate hemihydrate to produce the hydrated material. The Diels-Alder adduct described as one additive of the present composition is provided by the reaction in a Diels-Alder manner between maleic anhydride and a natural resin acid which may be further characterized as one containing a 1,3-dienically unsaturated acid or one convertible thereto by isomerization. The resin acids are generally found in resins such as wood rosin, gum rosin and so-called tall oil rosin. In the commercial rosin products, these acids are generally considered to be mixtures in various proportions of abietic, levopimaric, palustric, neoabietic, dihydroabietic, dextropimaric and perhaps other acids. As is well known, maleic anhydride reacts as the dienophile in such adductions. In should be stated that maleic acid is the equivalent of maleic anhydride in preparing these adducts. Generally in the present compositions it is preferred to incorporate the adducts of maleic anhydride and the natural resin acid in the form of an emulsion wherein the adduct has been converted at least partially to a water-soluble alkali metal soap. These emulsions can be most conveniently prepared by emulsification of the acid adduct with a soap forming alkaline material such as sodium or potassium hydroxide. The reaction is relatively straightforward and comprises reacting in an aqueous medium the adduct and an alkaline material.

Generally for good results the acid adduct need not be completely converted to soap, but it is preferred that some of such adduct should be in water soluble soap form, particularly since the adduct in this form is more readily incorporated into the gypsum composition as an emulsion added to the gauging water which is subsequently added to the stucco. In the preparation of the maleic anhydride-resin acid adducts it should be stated that the two reactants should be present in the reaction mixture from equimolar quantities to as low as 2 parts of maleic anhydride to 100 parts of rosin. This latter provides an adduct which has an acid number of about 165 which is the minimum.

The acidic precipitant is preferably an acidic or acid reacting salt such as for example alum (aluminum sulfate), zinc sulfate, aluminum chloride, ferric chloride, or the like. Such acid reacting salts are well known in the art as precipitants.

Broadly, the gypsum compositions of the present invention contain from about 0.075 to about 0.75, preferably 0.1 to 0.5, percent by weight of the aforesaid adduct of maleic anhydride and the resin acid preferably in soap form. The acidic precipitant is present in from about 0.1 to about 0.5 percent by weight. The percentages are based on the hydrated set gypsum composition in its final set form.

The novel gypsum compositions of the present invention are prepared in a conventional manner well known in the art. Broadly the procedure involves placing the raw materials, calcined gypsum (stucco), water, foam and accelerators and other conventional additives, into a mixer followed by agitation to thoroughly blend the materials. After mixing in the conventional mixers the plaster material is removed from the mixer and formed into sheets, perforated lath, gypsum tile, or other finished products. After these products have been formed and set they are dried and are ready for shipment and use.

The following examples will illustrate the preparation of the adducts and the gypsum compositions of the present invention wherein parts are expressed in parts by weight.

EXAMPLE 1

*Adduct of maleic anhydride and tall oil resin acids*

To 620 parts of resin acids derived from tall oil were added 196 parts of maleic anhydride. The reaction mixture was heated at about 235° C. for one hour. At the end of this reaction period unreacted maleic anhydride was removed by distillation with superheated steam. The residual adduct had an acid number of 260 and was formed into an emulsion by grinding 100 parts of the adduct so obtained to pass a 40 mesh screen. The resulting powder was suspended in a room temperature solution of 26 parts of commercial potassium hydroxide in 450 parts of water. The slurry so formed was heated to boiling, with agitation, to produce a concentrated emulsion of the potassium soap of the Diels-Alder adduct of maleic anhydride and the tall oil resin acids. This concentrate may be diluted to any desired concentration of adduct soap, but it should be noted that the initial dilution is preferably effected using hot water.

EXAMPLE 2

*Production of perforated lath*

To 1600 parts of calcined gypsum were added 12 parts of alum (aluminum sulfate). To this mixture were added 1440 parts of water containing 36 parts of a 20% emulsion of the potash soap of the adduct of maleic anhydride and tall oil resin acids prepared as in Example 1. The calcined gypsum, water, together with conventional additives such as bond reinforcers (degraded starch, 8 parts) and set control agents ($CaSO_4 \cdot 2H_2O$, 2 parts), were blended in a mixer. The resulting plaster was removed from the mixer and placed between sized cover sheets to form a lath having a thickness of about ⅜ inch. Circular perforations about ¾ inch in diameter were made in the wet set sheet which was then dried.

The perforations of the dried perforated gypsum lath were utilized to determine the relative water absorption characteristics of the gypsum core. In this test the bottom of a cylindrical perforation was sealed to form a cavity ⅜" deep and ¾" in diameter. Five (5) milliliters of water at 70° F. were placed in the cavity so formed. The time required for the complete absorption of the 5 milliliters of water is referred to as the "5 milliliter absorption rate."

In the case of the lath described in Example 2, the 5 milliliter absorption rate was found to be 2130 seconds as contrasted to a lath prepared in this same fashion, but without addition of the resin acid adduct and the alum, which had a 5 milliliter absorption time of 120 seconds.

EXAMPLE 3

*Adduct of maleic anhydride and FF wood rosin*

FF wood rosin (800 parts) was reacted with maleic anhydride (260 parts) by heating for one hour at 235° C. under a blanket of carbon dioxide. At the end of this period unreacted maleic anhydried was removed by steam distillation and the product treated with aqueous sodium carbonate to form a dilute emulsion similar to the procedure employed in Example 1. This product was used to prepare a perforated gypsum lath as described in Example 2, using 2.9 parts of adduct, 6 parts of alum, 1190 parts of gauging water, 5 parts of $CaSO_4 \cdot 2H_2O$ and 1600 parts of calcined gypsum. The 5 milliliter absorption rate of the dried perforated lath prepared therefrom was 887 seconds.

Similarly it has been found that gum rosin may also be reacted with maleic anhydried in a Diels-Alder manner and subsequently saponified to produce a soap which is useful in reducing the water absorption tendencies of the set gypsum core of perforated gypsum lath when incorporated into gypsum as taught by the present invention.

While the foregoing examples illustrate the use of conventional additives such as set control agents or bond reinforcers, such use is not necessary in the preparation of these gypsum compositions and the invention is fully operative in their absence.

It will be understood that calcium ions or cations of the precipitants or their equivalents may react with the adduct and accordingly it is not known whether the adduct in the product of this invention exists as the free acid, or as a soap, or both. Such soaps, if present, are intended to be encompassed within the term "adduct" as used in this specification and the appended claims.

While the foregoing examples have been illustrative of the utility of the present gypsum compositions in the production of perforated gypsum lath, it is also true that this characteristic of reduced water absorption is equally valuable for use in other materials formed from gypsum which are subsequently coated with plaster. As has been previously stated, the incorporation of the adducts hereinbefore described has been extremely valuable in reducing the "hot holing" of perforated lath. Thus plaster may be applied thereto without rapid and concomitant stiffening of the plaster thereby permitting an increased working time for the plaster applied to the lath.

While several specific embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A gypsum composition consisting essentially of set gypsum crystals containing an acidic salt precipitant and a minor amount of the reaction product of maleic anhydride and rosin wherein the maleic anhydride is initially present in an amount of at least two parts per 100 parts of rosin and wherein said reaction product has an acid number of greater than 165.

2. A perforated gypsum lath having a reduced water absorption rate which comprises paper cover sheets encasing a core consisting essentially of set gypsum crystals in admixture with a minor amount of a soap of a Diels-Alder adduct having an acid number greater than about 165 of maleic anhydride and a 1,3-dienically unsaturated natural resin acid selected from the group consisting of wood rosin, gum rosin, and tall oil rosin; and an acidic salt precipitant.

3. A perforated gypsum lath having a reduced water absorption rate which comprises paper cover sheets encasing a core consisting essentially of set gypsum crystals in admixture with from 0.075% to 0.75% by weight of a Diels-Alder adduct having an acid number greater than about 165 of maleic anhydride and a 1,3-dienically unsaturated natural resin acid, and from about 0.1 to 0.5% by weight of an acidic salt precipitant.

4. The perforated gypsum lath of claim 3 wherein the 1,3-dienically unsaturated natural resin acid is that occurring in a resin selected from the group consisting of wood rosin, gum rosin and tall oil rosin.

5. A perforated gypsum lath having a reduced water absorption rate which comprises paper cover sheets encasing a core consisting essentially of set gypsum crystals in admixture with from 0.1 to 0.5% by weight of a Diels-Alder adduct having an acid number greater than about 165 of maleic anhydride and a natural resin acid occurring in a resin selected from the group consisting of wood rosin, gum rosin and tall oil rosin; and from 0.1 to 0.5% by weight of an acidic salt precipitant.

6. A gypsum composition consisting essentially of a set mixture of gypsum crystals containing therein a minor amount of a Diels-Alder adduct having an acid number greater than about 165 of maleic anhydride and a 1,3-dienically unsaturated natural resin acid and an acidic salt precipitant.

7. A gypsum composition consisting essentially of a set mixture of gypsum crystals containing therein a minor amount of a soap of a Diels-Alder adduct having an acid number greater than about 165 of maleic anhydride and a 1,3-dienically unsaturated natural resin acid and an acidic salt precipitant.

8. A gypsum composition consisting essentially of an admixture of set gypsum crystals containing an acidic salt precipitant and from 0.075 to 0.75 percent by weight of a Diels-Alder adduct having an acid number greater than about 165 of maleic anhydride and a natural resin acid contained in resins selected from the group consisting of wood rosin, gum rosin and tall oil rosin.

9. A gypsum composition consisting essentially of set gypsum crystals containing admixed therewith from 0.075 to 0.75 percent by weight of a Diels-Alder adduct having an acid number greater than about 165 of maleic anhydride and a 1,3-dienically unsaturated natural resin acid and from 0.1 to 0.5 percent by weight of an acidic salt precipitant.

10. A gypsum composition consisting essentially of set gypsum crystals containing admixed therewith from 0.075 to 0.75 percent by weight of a Diels-Alder adduct having an acid number greater than about 165 of maleic anhydride and natural resin acid occurring in the resin selected from the group consisting of wood rosin, gum rosin and tall oil rosin and from 0.1 to 0.5 percent by weight of an acidic salt precipitant.

11. A gypsum composition consisting essentially of set gypsum crystals containing admixed therewith from 0.1 to 0.5 percent by weight of a Diels-Alder adduct having an acid number greater than about 165 of maleic anhydride and a 1,3-dienically unsaturated natural resin acid, and from about 0.1 to 0.5 percent by weight of an acidic salt precipitant.

12. A preforated gypsum lath having a reduced water absorption rate which comprises paper cover sheets encasing a core consisting essentially of set gypsum crystals in admixture with a minor amount of a Diels-Alder adduct having an acid number greater than about 165 of maleic anhydride and a 1,3-dienically unsaturated natural resin acid and an acidic salt precipitant.

References Cited in the file of this patent

UNITED STATES PATENTS

| | | |
|---|---|---|
| 2,141,570 | Mark | Dec. 27, 1938 |
| 2,585,222 | Bruins et al. | Feb. 12, 1952 |
| 2,610,130 | Riddel et al. | Sept. 2, 1952 |
| 2,776,277 | Keim | Jan. 1, 1957 |
| 2,804,439 | Drechsel | Aug. 27, 1957 |

OTHER REFERENCES

Von Fisher, Paint and Varnish Technology, Reinhold Publishing Corp., New York, 1948, pp. 108–111.